UNITED STATES PATENT OFFICE.

WILLIAM J. OCHS, OF JERSEY CITY, NEW JERSEY.

COMPOSITION OF MATTER USED FOR POLISHING PURPOSES.

937,170.    Specification of Letters Patent.    Patented Oct. 19, 1909.

No Drawing.    Application filed May 10, 1909.    Serial No. 495,162.

*To all whom it may concern:*

Be it known that I, WILLIAM J. OCHS, a citizen of the United States, and residing at Jersey City, in the county of Hudson and State of New Jersey, have invented a certain new and useful Improved Composition of Matter Used for Polishing Purposes, of which the following is a specification, such as will enable those skilled in the art to which it appertains to make and use the same.

My composition consists of the following ingredients combined in the proportions stated, viz:—ground or granulated cork one-half ounce, powdered cement three ounces, powdered emery one ounce, powdered carbonate of sodium one-half ounce, powdered camphor one-half ounce.

In practice, the carbonate of sodium and camphor are first dissolved in water and boiled, and in this condition the ground or granulated cork, powdered cement and powdered emery are thoroughly mingled or mixed therewith so as to form a plastic mass, which mass may be molded into bricks or blocks of any desired shape, form or size, and these bricks or blocks may be used for polishing purposes in the same manner as other polishing substances or devices of this class.

Having fully described my invention, what I claim as new and desire to secure by Letters Patent, is:—

The herein described composition of matter for use as a polishing material, consisting of ground or granulated cork one-half ounce, powdered cement three ounces, powdered emery one ounce, powdered carbonate of sodium one-half ounce, and powdered camphor one-half ounce.

In testimony that I claim the foregoing as my invention I have signed my name in presence of the subscribing witnesses this 7th day of May 1909.

WILLIAM J. OCHS.

Witnesses:
C. E. MULREANY,
H. R. CANFIELD.